US012759743B2

(12) United States Patent
Huang et al.

(10) Patent No.: US 12,759,743 B2
(45) Date of Patent: Oct. 13, 2026

(54) CONTACT LENS PRODUCT, PACKAGING CASE THEREOF, AND DETECTION METHOD FOR THE SAME

(71) Applicant: PEGAVISION CORPORATION, Taoyuan City (TW)

(72) Inventors: Yi-Fang Huang, Kinmen County (TW); Po-Chun Chen, New Taipei City (TW)

(73) Assignee: PEGAVISION CORPORATION, Taoyuan City (TW)

( * ) Notice: Subject to any disclaimer, the term of this patent is extended or adjusted under 35 U.S.C. 154(b) by 0 days.

(21) Appl. No.: 18/730,298

(22) PCT Filed: Jun. 17, 2022

(86) PCT No.: PCT/CN2022/099372
§ 371 (c)(1),
(2) Date: Jul. 18, 2024

(87) PCT Pub. No.: WO2023/240581
PCT Pub. Date: Dec. 21, 2023

(65) Prior Publication Data
US 2025/0100729 A1 Mar. 27, 2025

(51) Int. Cl.
*B65B 25/00* (2006.01)
*B65B 55/22* (2006.01)
*G01M 11/02* (2006.01)

(52) U.S. Cl.
CPC ............ *B65B 25/008* (2013.01); *B65B 55/22* (2013.01); *G01M 11/0278* (2013.01)

(58) Field of Classification Search
CPC . B65D 2585/545; A45C 11/005; A45C 11/04; A45C 11/046
(Continued)

(56) References Cited

U.S. PATENT DOCUMENTS 4,337,858 A 7/1982 Thomas et al.
4,623,249 A 11/1986 Grant
(Continued)

FOREIGN PATENT DOCUMENTS

CN 1091385 A 8/1994
CN 101548152 A 9/2009
(Continued)

*Primary Examiner* — Chun Hoi Cheung
*Assistant Examiner* — Brijesh V. Patel
(74) *Attorney, Agent, or Firm* — Li & Cai Intellectual Property Office

(57) ABSTRACT

A contact lens product, a packaging case thereof, and a detection method for the same are provided. The packaging case (1) includes an accommodating slot body (11) and a sheet body (12) connected to the accommodating slot body (11). The accommodating slot body (11) has a plurality of optical microstructures (11*c*) formed on an inner surface (11*b*) thereof. Each of the optical microstructures (11*c*) has a height-to-width ratio being within a range from 0.01 to 0.1, whereby the accommodating slot body (11) has a first transparency. The accommodating slot body (11) is configured to allow at least part of the optical microstructures (11*c*) to be in contact with a preservation liquid (4) for enabling a part of the accommodating slot body (11) corresponding in position thereto to have a second transparency that is greater than the first transparency.

5 Claims, 11 Drawing Sheets

(58) Field of Classification Search
USPC .................... 206/5.1, 210; 134/901; 294/1.2; D3/264; 428/156, 143
See application file for complete search history.

(56) References Cited

U.S. PATENT DOCUMENTS

| | | | | | |
|---|---|---|---|---|---|
| 5,467,868 | A * | 11/1995 | Abrams | A61F 2/1691 | 134/901 |
| 5,609,246 | A * | 3/1997 | Borghorst | B65D 77/2036 | 206/5.1 |
| 5,936,704 | A * | 8/1999 | Gabrielian | G02C 7/021 | 351/159.69 |
| 7,225,919 | B2 * | 6/2007 | Hamilton | B65D 75/326 | 134/901 |
| 9,763,506 | B2 * | 9/2017 | Tang | A45C 11/005 | |
| 10,718,717 | B2 | 7/2020 | Smorgon et al. | | |
| 2004/0004008 | A1 * | 1/2004 | Peck | A45C 11/005 | 206/210 |
| 2008/0230403 | A1 * | 9/2008 | Lipscomb | A45C 11/005 | 206/5.1 |
| 2009/0226668 | A1 * | 9/2009 | Simon | A61F 2/30767 | 428/210 |
| 2009/0303432 | A1 * | 12/2009 | Suzuki | B29D 11/0049 | 351/159.02 |
| 2011/0094898 | A1 | 4/2011 | Tang et al. | | |
| 2016/0258880 | A1 | 9/2016 | Smorgon et al. | | |
| 2019/0072499 | A1 | 3/2019 | Unterkofler et al. | | |
| 2022/0066238 | A1 * | 3/2022 | Linn | G02C 7/049 | |

FOREIGN PATENT DOCUMENTS

| | | | | |
|---|---|---|---|---|
| CN | 102595957 | A | 7/2012 | |
| CN | 105612438 | A | 5/2016 | |
| CN | 106490805 | A | 3/2017 | |
| CN | 110618142 | A | 12/2019 | |
| CN | 210943095 | U | 7/2020 | |
| EP | 0660098 | B1 | 4/1999 | |
| EP | 2490566 | A2 | 8/2012 | |
| EP | 2490566 | B1 | 9/2013 | |
| JP | 200046692 | A | 2/2000 | |
| JP | 201459590 | A | 4/2014 | |
| JP | 2022076894 | A | 5/2022 | |
| KR | 1020090094440 | A | 9/2009 | |
| KR | 102303721 | B1 | 9/2021 | |
| WO | WO-2011048452 | A2 * | 4/2011 | G01M 11/0278 |
| WO | WO2012131786 | A1 | 10/2012 | |

* cited by examiner

CONTACT LENS PRODUCT, PACKAGING CASE THEREOF, AND DETECTION METHOD FOR THE SAME

FIELD OF THE DISCLOSURE

The present disclosure relates to a packaging case, and more particularly to a contact lens product, a packaging case thereof, and a detection method for the same.

BACKGROUND OF THE DISCLOSURE

A conventional contact lens product includes a packaging case and a contact lens that is disposed in the packaging case, and an inner surface of the packaging case has a protrusion for preventing the contact lens from being adhered thereon. However, the protrusion of the packaging case is provided without consideration for optical design, such that the protrusion is not conducive to testing of the conventional contact lens product through a corresponding optical instrument (e.g., the protrusion of the conventional contact lens product easily generates light and shadow, which may affect the optical instrument during testing).

Therefore, the inventor believes that the above-mentioned defects can be improved, and devoted themselves to research while applying scientific principles, such as to finally propose an invention that is appropriately designed and effectively improves on the above-mentioned disadvantages.

SUMMARY OF THE DISCLOSURE

The present disclosure provides a contact lens product, a packaging case thereof, and a detection method for the same, thereby effectively improving on the issues associated with conventional contact lens products.

Embodiments of the present disclosure provide a detection method for a contact lens product, which includes: a preparing step implemented by providing a packaging case that has an accommodating slot body, wherein the accommodating slot body has a first transparency; a slot detection step implemented by using an optical detection instrument to perform a slot defect detection process for the accommodating slot body; a packaging step implemented by placing a contact lens and a preservation liquid in the accommodating slot body and sealing the contact lens and the preservation liquid in the accommodating slot body through a sealing layer, thereby jointly being formed as a contact lens product, wherein a part of the accommodating slot body being in contact with the preservation liquid is defined as a wet region and has a second transparency that is greater than the first transparency; and a lens detection step implemented by using the optical detection instrument to perform a lens defect detection process for the contact lens located in the accommodating slot body.

Preferably, in the packaging step, the accommodating slot body is not fully filled with the preservation liquid, so that the contact lens product has a bubble in the accommodating slot body, wherein a part of the accommodating slot body being in contact with the bubble is defined as a dry region and has the first transparency.

Preferably, in the lens defect detection step, the contact lens is entirely immersed in the preservation liquid, and the contact lens corresponds in position to the wet region of the accommodating slot body.

Preferably, the accommodating slot body has a plurality of optical microstructures arranged on an inner surface thereof, and each of the optical microstructures has a height-to-width ratio being within a range from 0.01 to 0.1.

Preferably, the packaging case is manufactured in an injection molding manner, and a material of the packaging case is selected from one of poly-methyl methacrylate (PMMA), polypropylene (PP), polycarbonate (PC), polystyrene (PS), and polyethylene terephthalate (PET).

Embodiments of the present disclosure also provide a contact lens product, which includes a packaging case including an accommodating slot body and a sheet body that is connected to the accommodating slot body, wherein the accommodating slot body has a plurality of optical microstructures arranged on an inner surface thereof, and each of the optical microstructures has a height-to-width ratio being within a range from 0.01 to 0.1, whereby the accommodating slot body has a first transparency; a sealing layer sealing an opening of the accommodating slot body, wherein the accommodating slot body and sealing layer jointly define an enclosed space surrounded thereby; and a contact lens and a preservation liquid both located in the enclosed space, wherein at least part of the optical microstructures is immersed in the preservation liquid for enabling a part of the accommodating slot body corresponding in position thereto to be defined as a wet region and to have a second transparency that is greater than the first transparency.

Preferably, the contact lens product has a bubble in the enclosed space, and a part of the optical microstructures is located in the bubble for enabling a part of the accommodating slot body corresponding in position thereto to be defined as a dry region and to have the first transparency.

Preferably, the optical microstructures are distributed on at least 70% of an area of the inner surface of the accommodating slot body.

Preferably, any one of the optical microstructures has a conical shape, and the optical microstructures are distributed on the inner surface of the accommodating slot body and are connected to each other.

Preferably, a depth of the accommodating slot body is within a range from 3 mm to 10 mm, and a width of any one of the optical microstructures is within a range from 0.01 mm to 0.1 mm.

Preferably, the packaging case is integrally formed as a single one-piece structure, and a material of the packaging case is selected from one of poly-methyl methacrylate (PMMA), polypropylene (PP), polycarbonate (PC), polystyrene (PS), and polyethylene terephthalate (PET).

Preferably, at least one of the optical microstructures is recessed in the inner surface of the accommodating slot body.

Preferably, at least one of the optical microstructures protrudes from the inner surface of the accommodating slot body.

Preferably, a part of at least one of the optical microstructures is recessed in the inner surface of the accommodating slot body, and another part of the at least one of the optical microstructures protrudes from the inner surface of the accommodating slot body.

Embodiments of the present disclosure further provides a packaging case of a contact lens product, which includes an accommodating slot body having a plurality of optical microstructures formed on an inner surface thereof, wherein each of the optical microstructures has a height-to-width ratio being within a range from 0.01 to 0.1, whereby the accommodating slot body has a first transparency; and a sheet body connected to the accommodating slot body; wherein the accommodating slot body is configured to allow at least part of the optical microstructures to be in contact with a preservation liquid for enabling a part of the accommodating slot body corresponding in position thereto to have a second transparency that is greater than the first transparency.

Preferably, a width of any one of the optical microstructures is within a range from 0.01 mm to 0.1 mm.

Preferably, any one of the optical microstructures has a conical shape, and the optical microstructures are distributed on at least 70% of an area of the inner surface of the accommodating slot body and are connected to each other.

Preferably, at least one of the optical microstructures is recessed in or protrudes from the inner surface of the accommodating slot body.

Preferably, a part of at least one of the optical microstructures is recessed in the inner surface of the accommodating slot body, and another part of the at least one of the optical microstructures protrudes from the inner surface of the accommodating slot body.

Therefore, the accommodating slot body in the detection method of the present disclosure is cooperated with the preservation liquid for being changeable between the first transparency and the second transparency, so that the slot detection step of the detection method is implemented to the accommodating slot body presented in the first transparency, and the lens detection step of the detection method is implemented to the accommodating slot body of the contact lens product presented in the second transparency, thereby facilitating the optical instrument to perform a complete detection.

Moreover, in any one of the contact lens product and the packaging case provided by the present disclosure, the optical microstructures having the similar height-to-width ratios (e.g., 0.01 to 0.1) are arranged on the inner surface of the accommodating slot body for being cooperated with the preservation liquid, thereby enabling a transparency of the accommodating slot body to be changeable between the first transparency and the second transparency, so that the accommodating slot body can be selectively presented in the first transparency or the second transparency according to different conditions.

These and other aspects of the present disclosure will become apparent from the following description of the embodiment taken in conjunction with the following drawings and their captions, although variations and modifications therein may be affected without departing from the spirit and scope of the novel concepts of the disclosure.

DETAILED DESCRIPTION OF THE EXEMPLARY EMBODIMENTS

Figure 1:
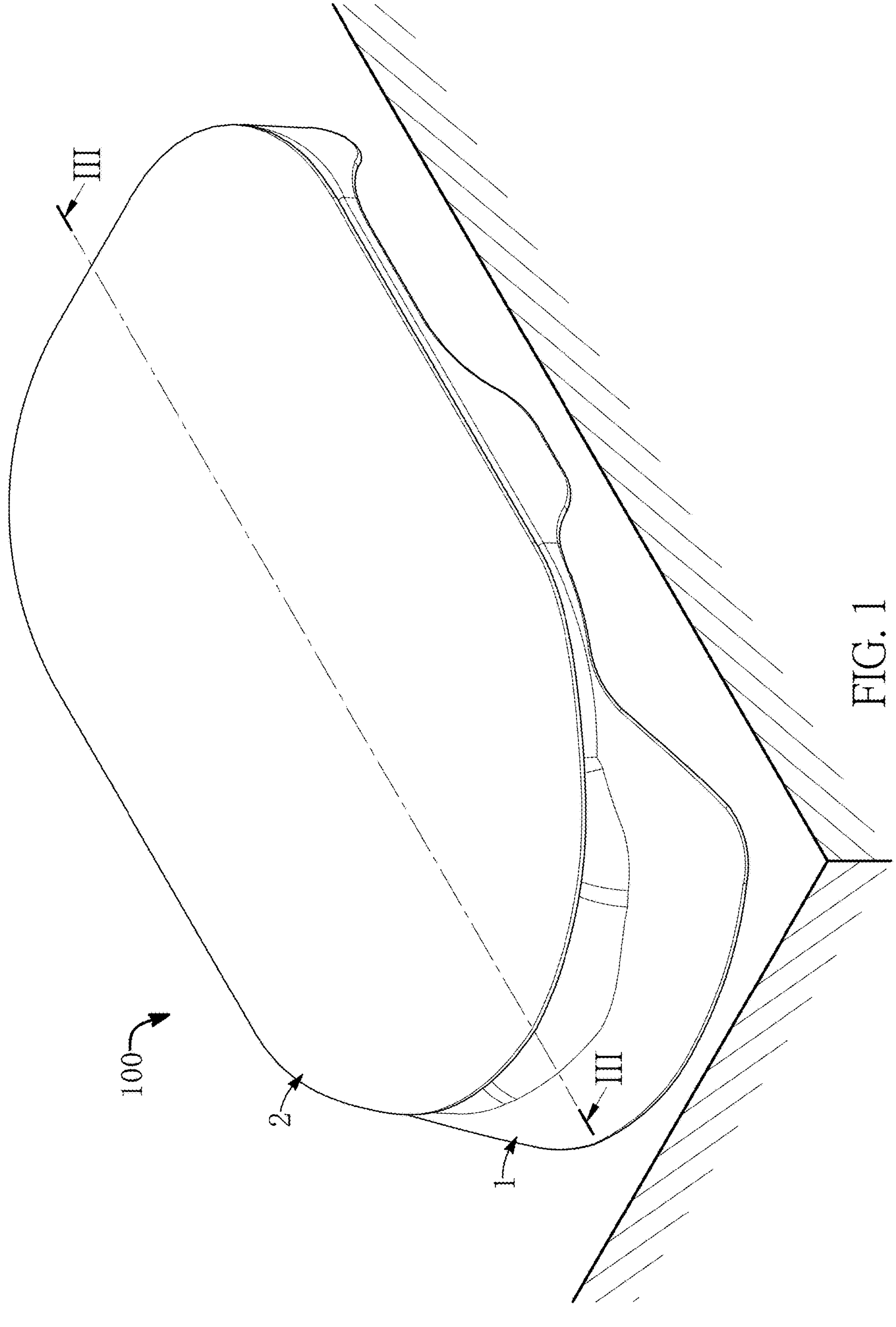
FIG. 1 is a schematic perspective view of a contact lens product according to an embodiment of the present disclosure.
Figure 2:
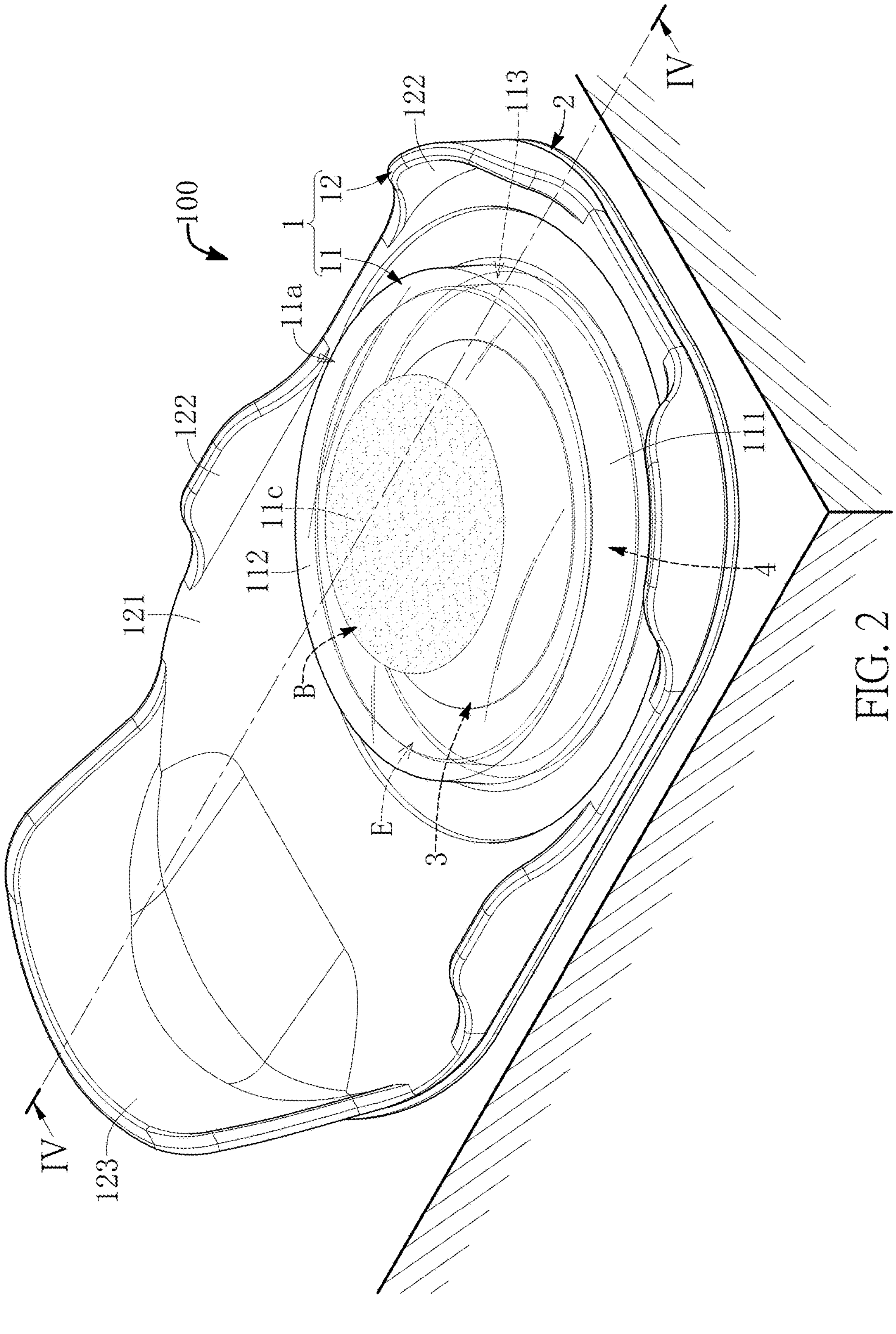
FIG. 2 is a schematic perspective view showing the contact lens product placed in another direction according to the embodiment of the present disclosure.
Figure 3:
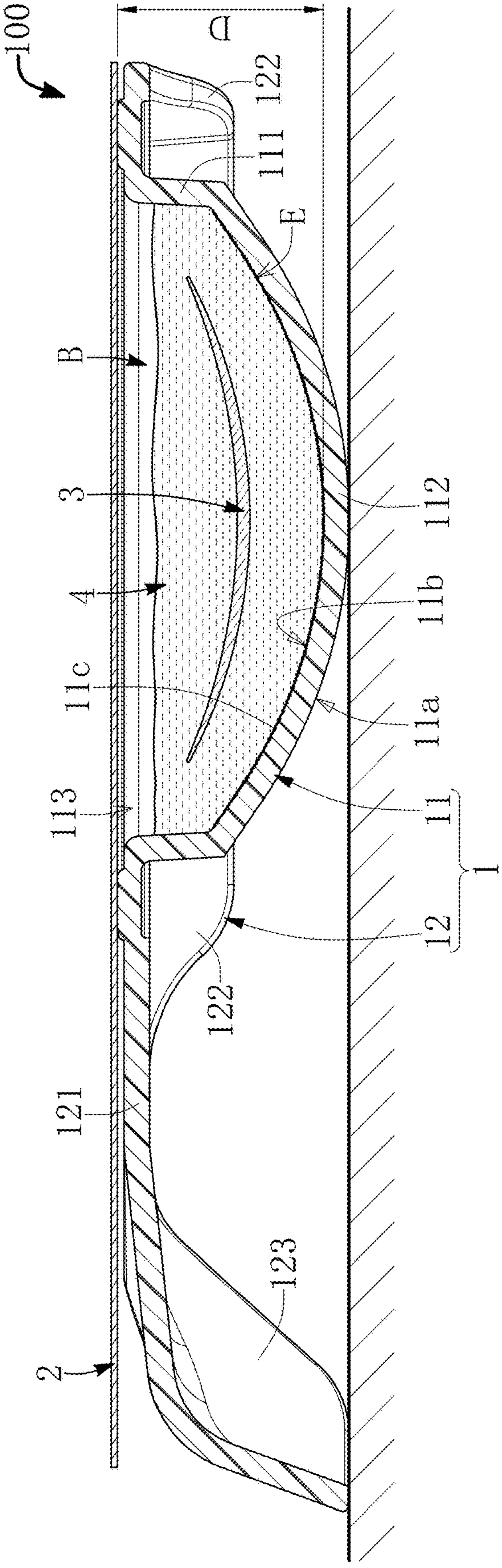
FIG. 3 is a schematic cross-sectional view taken along line III-III of FIG. 1.

"A packaging case, and more particularly to a contact lens product, a packaging case thereof, and a detection method for the same" provided by the present disclosure are more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 11, an embodiment of the present disclosure is provided. The present embodiment provides a contact lens product 100 and a detection method S100 for the same. In order to realize the present embodiment, the following description first describes the contact lens product 100, and then describes the detection method S100.

As shown in FIG. 1 to FIG. 5, the contact lens product 100 includes a packaging case 1, a sealing layer 2 adhered onto the packaging case 1, a preservation liquid 4 located in the packaging case 1, and a contact lens 3 that is immersed in the preservation liquid 4. It should be noted that the packaging case 1 in the present embodiment is in cooperation with the sealing layer 2, the preservation liquid 4, and the contact lens 3, but the present disclosure is not limited thereto. For example, in other embodiments of the present disclosure not shown in the drawings, the packaging case 1 can be independently used (e.g., sold).

In the present embodiment, the packaging case 1 is preferably formed integrally as a single one-piece structure, the packaging case 1 is substantially light-permeable, and a material of the packaging case 1 can be selected from one of poly-methyl methacrylate (PMMA), polypropylene (PP), polycarbonate (PC), polystyrene (PS), and polyethylene terephthalate (PET), but the present disclosure is not limited thereto. For example, in other embodiments of the present disclosure not shown in the drawings, the packaging case 1 can be formed of multiple pieces; or, the packaging case 1 can be made of other polymer materials according to design requirements.

Specifically, as shown in FIG. 4 and FIG. 6 to FIG. 8, the packaging case 1 includes an accommodating slot body 11 and a sheet body 12 that is connected to the accommodating slot body 11. The sheet body 12 includes a sheet portion 121 surrounding and being connected to the accommodating slot body 11, a plurality of protruding portions 122 perpendicularly connected to a bottom of the sheet portion 121, and a handheld portion 123 that is slantingly connected to an end of the sheet portion 121. The protruding portions 122 are arranged outside of the accommodating slot body 11, a height of each of the protruding portions 122 is less than a height of the accommodating slot body 11, and the handheld portion 123 is connected to the end of the sheet portion 121 away from the accommodating slot body 11.

Moreover, the accommodating slot body 11 in the present embodiment includes a ring-shaped segment 111 connected to the sheet body 12 and an accommodating segment 112 that is connected to the ring-shaped segment 111. An end of the ring-shaped segment 111 connected to the sheet body 12 defines an opening 113, the accommodating segment 112 is substantially a hollow hemispherical shape (e.g., a contour of the accommodating segment 112 is smaller than a hemispherical shape), and a center of the hemispherical shape of the accommodating segment 112 is located outside of a space surrounded by the accommodating slot body 11. In other words, the accommodating slot body 11 has a depth D that is within a range from 3 mm to 10 mm and that is less than a diameter of the accommodating segment 112, but the present disclosure is not limited thereto.

In addition, an outer surface 11*a* of the accommodating slot body 11 is a smooth and curved surface, an inner surface 11*b* of the accommodating slot body 11 has a plurality of optical microstructures 11*c* arranged thereon, and each of the optical microstructures 11*c* has a height-to-width ratio (H/W) being within a range from 0.01 to 0.1, whereby the accommodating slot body 11 has a first transparency. For example, a width W of any one of the optical microstructures 11*c* can be within a range from 0.01 mm to 0.1 mm, and a height H of any one of the optical microstructures 11*c* is within a range from 0.001 mm to 0.01 mm.

In summary, the optical microstructures 11*c* of the present embodiment distributed on the inner surface 11*b* have a substantially same size and a substantially same shape (e.g., any one of the optical microstructures 11*c* has a substantially conical shape), so that microstructures of different sizes provided according to different regions cannot correspond to the optical microstructures 11*c* in the present embodiment.

Specifically, the optical microstructures 11*c* in the present embodiment are distributed on at least 70% of an area of the inner surface 11*b* of the accommodating slot body 11, and the optical microstructures 11*c* are preferably connected to each other for being distributed on the (at least 70% of) area of the inner surface 11*b* of the accommodating slot body 11, but the present disclosure is not limited thereto.

In the present embodiment, the optical microstructures 11*c* can be arranged to outwardly extend from a center of an inner side of the accommodating segment 112 (or extend toward the opening 113), until at least 70% of the area of the inner surface 11*b* is distributed with the optical microstructures 11*c*. In other words, the optical microstructures 11*c* can be only distributed on the inner side of the accommodating segment 112, or the optical microstructures 11*c* can be mostly distributed on an entirety of the inner side of the accommodating segment 112 and an entirety of an inner side of the ring-shaped segment 111.

Figure 8:
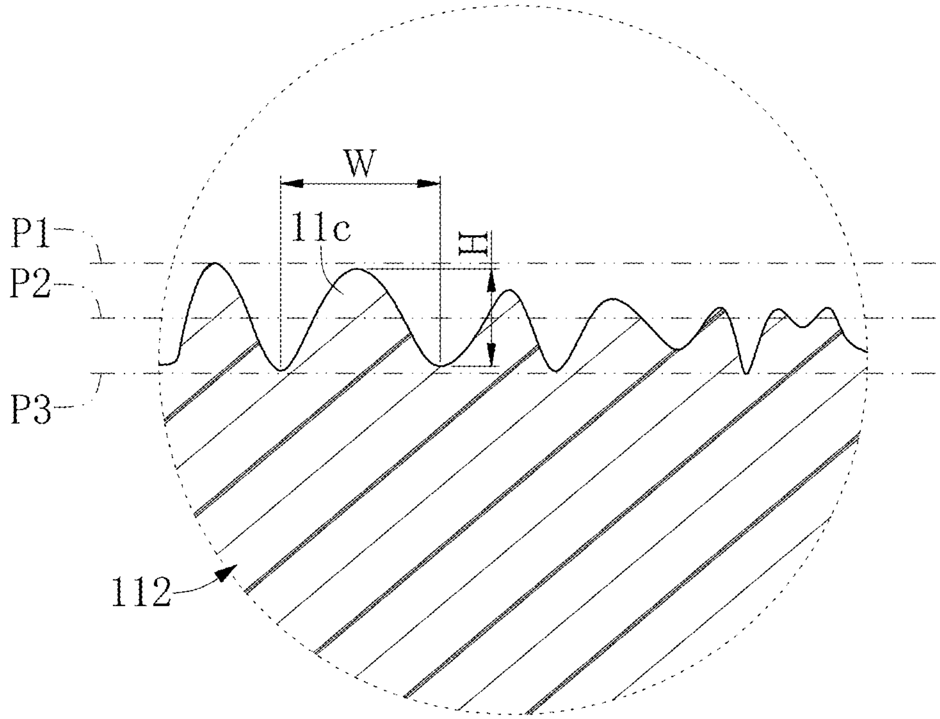
FIG. 8 is a schematic enlarged view of part VIII of FIG. 7.

Moreover, a relative position between any one of the optical microstructures 11*c* and the inner surface 11*b* can be adjusted or changed according to design requirements. For example, the inner surface 11*b* can be one of predetermined surfaces P1, P2, P3 as shown in FIG. 8. In other words, at least one of the optical microstructures 11*c* is recessed in or protrudes from the inner surface 11*b* of the accommodating slot body 11; or, a part of at least one of the optical microstructures 11*c* is recessed in the inner surface 11*b* of the accommodating slot body 11, and another part of the at least one of the optical microstructures 11*c* protrudes from the inner surface 11*b* of the accommodating slot body 11.

The sealing layer 2 is opaque and is adhered onto the sheet body 12 for sealing the opening 113 of the accommodating slot body 11, such that the sealing layer 2 and the accommodating slot body 11 jointly define an enclosed space E surrounded thereby. The contact lens 3 and the preservation liquid 4 are located in the enclosed space E, and the contact lens product 100 has a bubble B in the enclosed space E (i.e., the accommodating slot body 11 is not fully filled with the preservation liquid 4), and at least part of the contact lens 3 is immersed in the preservation liquid 4, but the present disclosure is not limited thereto. For example, in other embodiments of the present disclosure not shown in the drawings, the enclosed space E can be provided without the bubble B.

Moreover, at least part of the optical microstructures 11*c* is immersed in the preservation liquid 4 for enabling a part of the accommodating slot body 11 corresponding in position thereto to be defined as a wet region R1 and to have a second transparency that is greater than the first transparency. Specifically, since the accommodating slot body 11 is formed with the optical microstructures 11*c*, light passing through the accommodating slot body 11 would be reflected and diffused through the optical microstructures 11*c*. Furthermore, a difference between a refractive index of the accommodating slot body 11 and a refractive index of the preservation liquid 4 is less than a difference between the refractive index of the accommodating slot body 11 and a refractive index of air, the height-to-width ratios of the optical microstructures 11*c* are close to each other, so that light passing through the wet region R1 has a fewer diffusion (i.e., the wet region R1 is conducive for light to pass directly therethrough) for enabling the wet region R1 to have the second transparency that is greater than the first transparency.

In summary, in the contact lens product 100 provided by the present embodiment, the optical microstructures 11*c* having the similar height-to-width ratios (e.g., 0.01 to 0.1) are arranged on the inner surface 11*b* of the accommodating slot body 11 for being cooperated with the preservation liquid 4, thereby enabling a transparency of the accommodating slot body 11 to be changeable between the first transparency and the second transparency, so that the accommodating slot body 11 can be selectively presented in the first transparency or the second transparency according to different conditions (e.g., different detection processes).

In order to enable the accommodating slot body 11 to be effectively presented in the first transparency or the second transparency, a distal end of any one of the optical microstructures 11*c* preferably excludes a flat surface, and the optical microstructures 11*c* are preferably distributed on the inner surface 11*b* of the accommodating slot body 11 in a random manner (or an irregular manner).

Moreover, through the optical microstructures 11*c* are arranged in the accommodating slot body 11 of the contact lens product 100 provided by the present embodiment, the inner surface 11*b* of the accommodating slot body 11 can be configured to prevent the contact lens 3 from being adhered thereto, thereby allowing a user to easily take out the contact lens 3 from the packaging case 1.

In addition, a part of the optical microstructures 11*c* is located in the bubble B for enabling a part of the accommodating slot body 11 corresponding in position thereto to be defined as a dry region R2 and to have the first transparency. In other words, any part of the inner surface 11*b* of the accommodating slot body 11 not being attached with the preservation liquid 4 (or any liquid) can be presented in the first transparency.

The above description describes the structure of the contact lens product 100, and the following description describes the detection method S100 being suitably applied for the contact lens product 100. In the present embodiment, the detection method S100 sequentially includes a preparing step S110, a slot detection step S130, a packaging step S150, and a lens detection step S170, but the present disclosure is not limited thereto. For example, in other embodiments of the present disclosure not shown in the drawings, the detection method S100 can be added with other steps at a suitable time according to practical requirements. The following description sequentially describes the above steps S110, S130, S150, S170 of the detection method S100.

Figure 6:
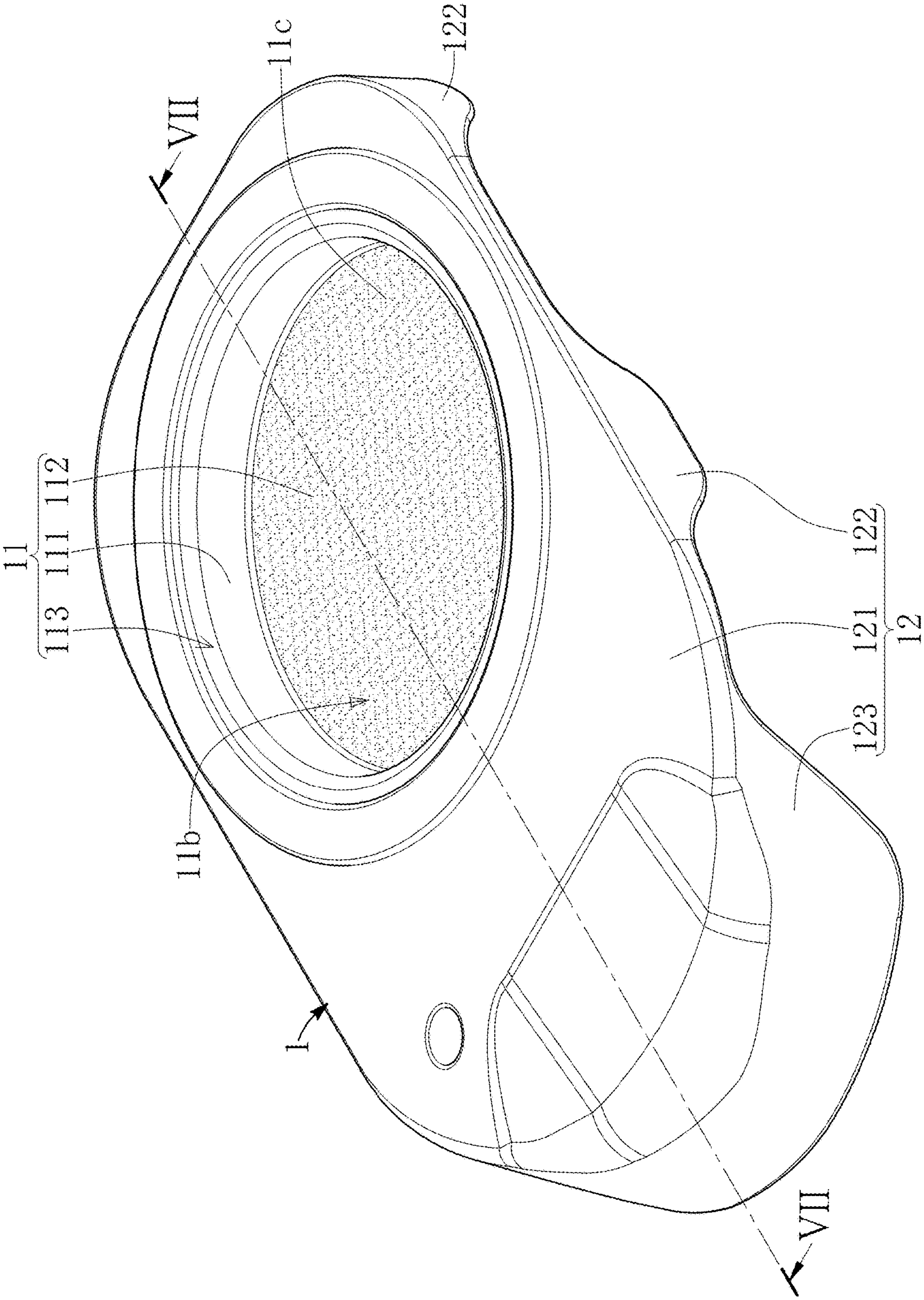
FIG. 6 is a schematic perspective view showing a packaging case of the contact lens product according to the embodiment of the present disclosure.
Figure 7:
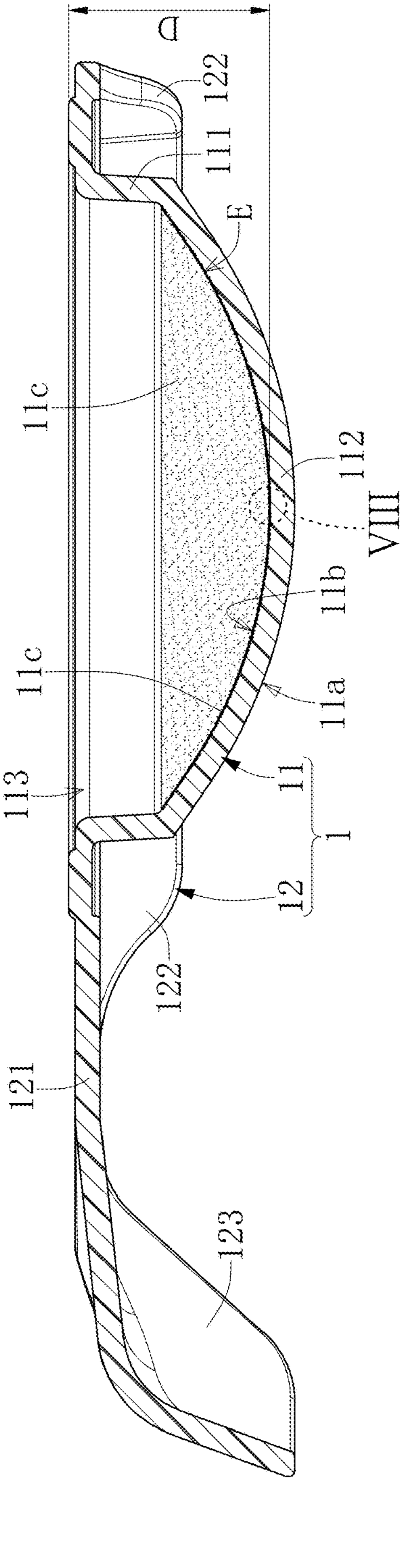
FIG. 7 is a schematic cross-sectional view taken along line IIV-IIV of FIG. 6.
Figure 9:
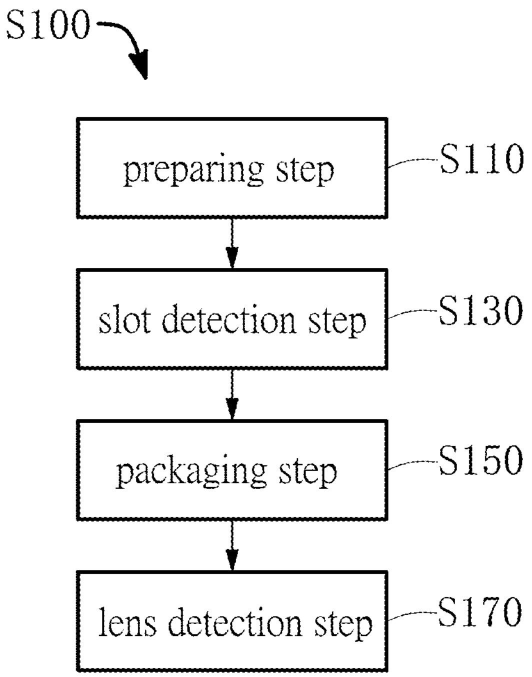
FIG. 9 is a flowchart of a detection method for the contact lens product according to the embodiment of the present disclosure.

As shown in FIG. 9 and FIG. 6, the preparing step S110 is implemented by providing the packaging case 1 that is preferably manufactured in an injection molding manner. The structure of the packaging case 1 is identical to the description corresponding to FIG. 6 and FIG. 7, and the description of the packaging case 1 will be omitted herein for the sake of brevity. However, the structure of the packaging case 1 can be adjusted or changed according to practical requirements. For example, in other embodiments of the present disclosure not shown in the drawings, the transparency of the accommodating slot body 11 can be changed between the first transparency and the second transparency through the cooperation between the accommodating slot body 11 and the preservation liquid 4.

Figure 10:
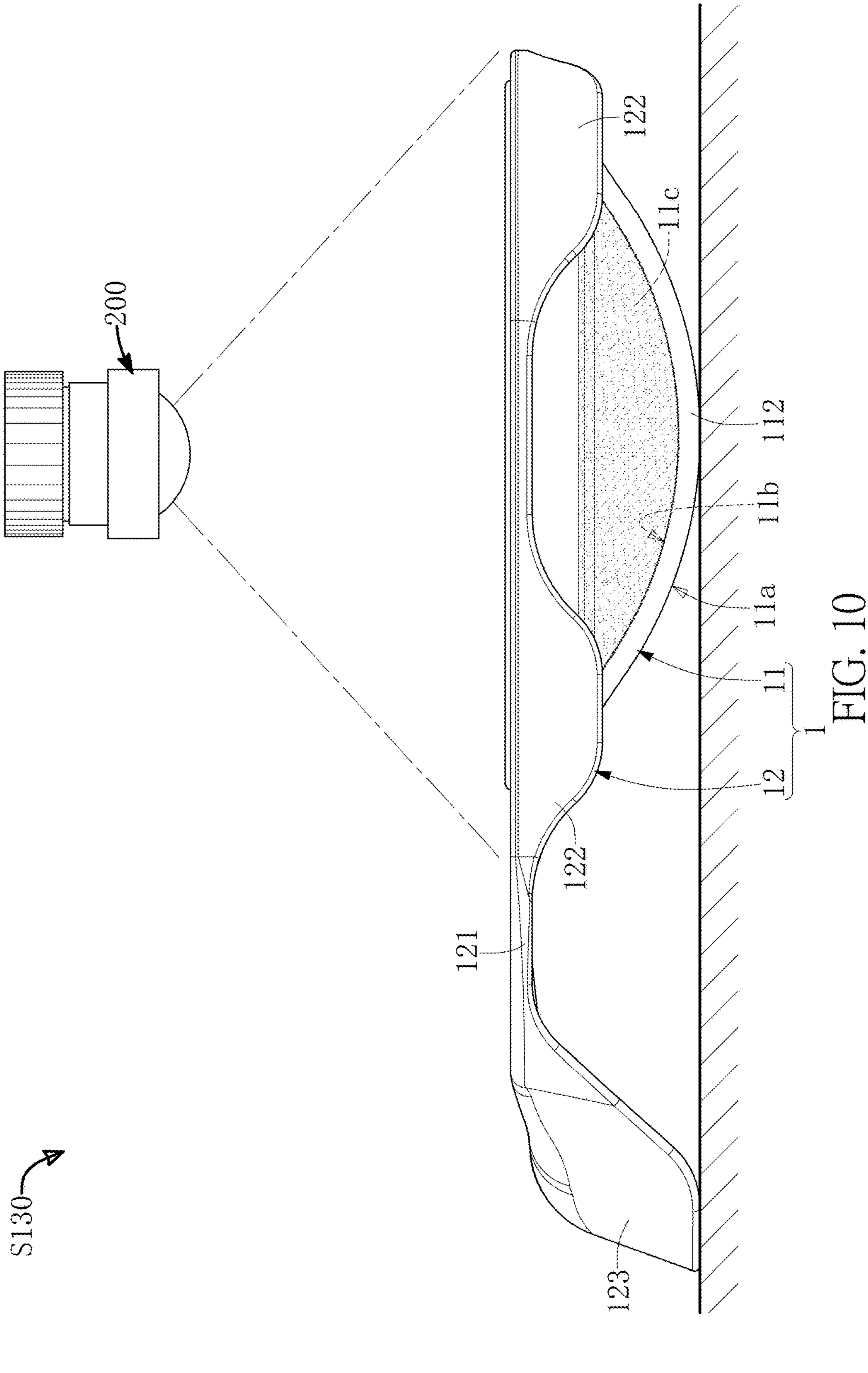
FIG. 10 is a schematic view showing a slot detection step of FIG. 9.

As shown in FIG. 9 and FIG. 10, the slot detection step S130 is implemented by using an optical detection instrument 200 to perform a slot defect detection process for the accommodating slot body 11. The optical detection instrument 200 in the present embodiment can be an automated optical inspection (AOI). Moreover, since the accommodating slot body 11 is presented in the first transparency (e.g., translucent), the accommodating slot body 11 allows light passing therethrough to be partially reflected, such that the optical detection instrument 200 can precisely detect any defect in the accommodating slot body 11.

Figure 4:
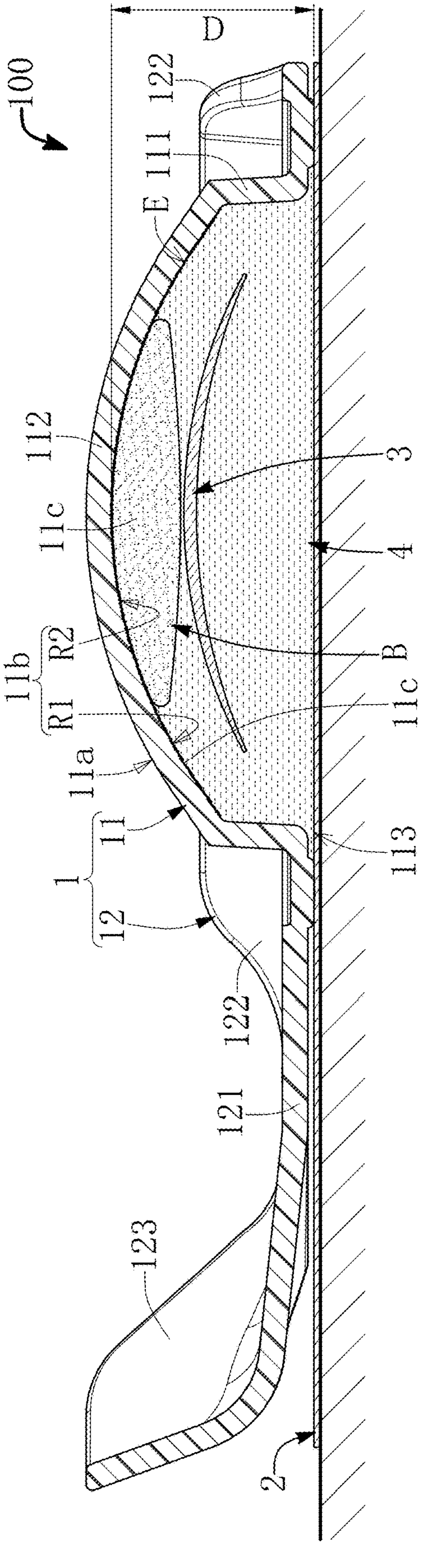
FIG. 4 is a schematic cross-sectional view taken along line IV-IV of FIG. 2.
Figure 5:
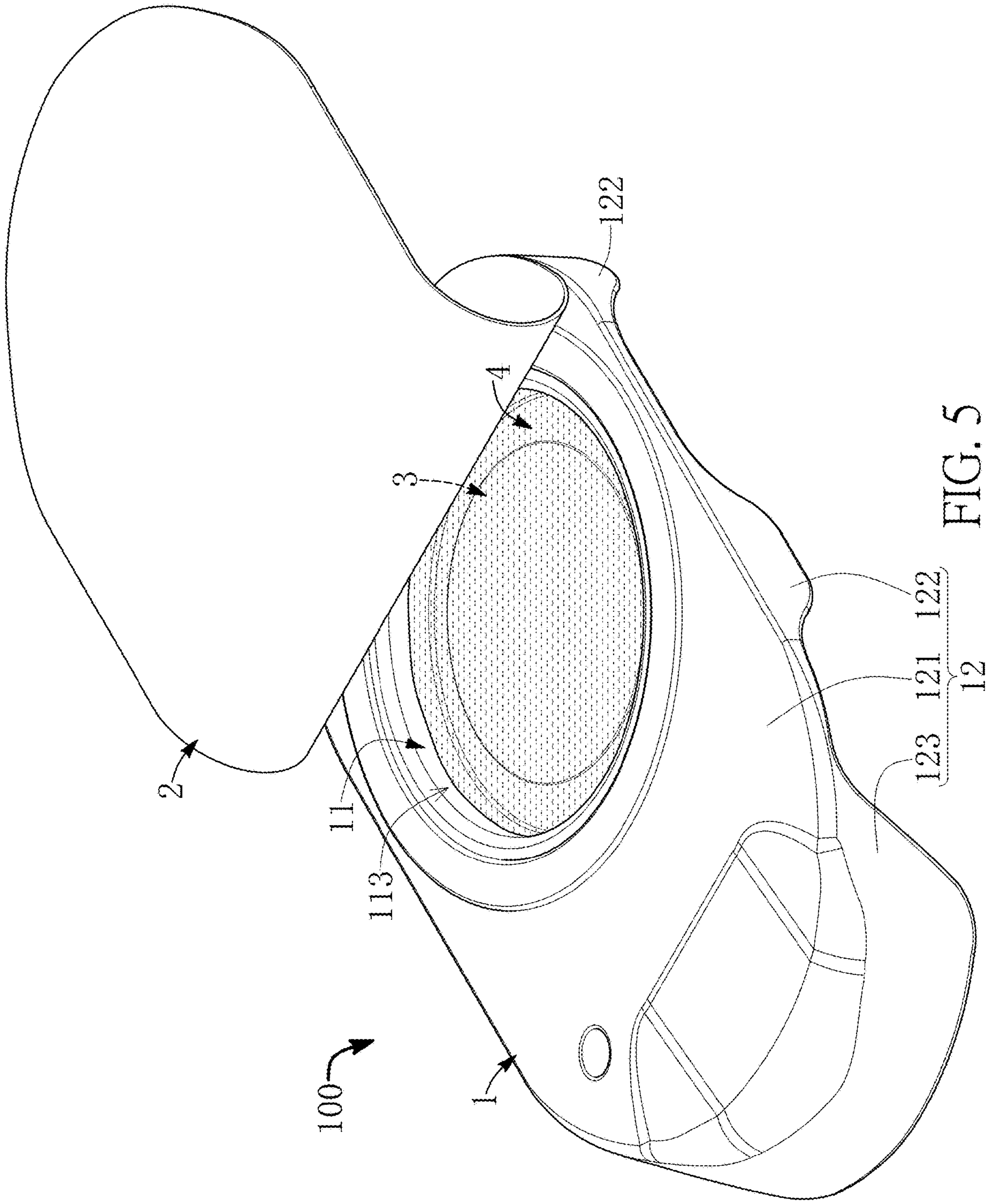
FIG. 5 is a schematic perspective view showing the contact lens product of FIG. 1 being opened.

As shown in FIG. 9 and FIG. 4, the packaging step S150 is implemented by placing the contact lens 3 and the preservation liquid 4 in the accommodating slot body 11, and sealing the contact lens 3 and the preservation liquid 4 in the accommodating slot body 11 (e.g., the enclosed space E) through the sealing layer 2, thereby jointly being formed as the contact lens product 100.

Moreover, a part of the accommodating slot body 11 being in contact with the preservation liquid 4 is defined as the wet region R1 and has the second transparency that is greater than the first transparency. Further, the accommodating slot body 11 is not fully filled with the preservation liquid 4, so that the contact lens product 100 has the bubble B in the accommodating slot body 11, and a part of the accommodating slot body 11 being in contact with the bubble B is defined as the dry region R2 and has the first transparency.

Figure 11:
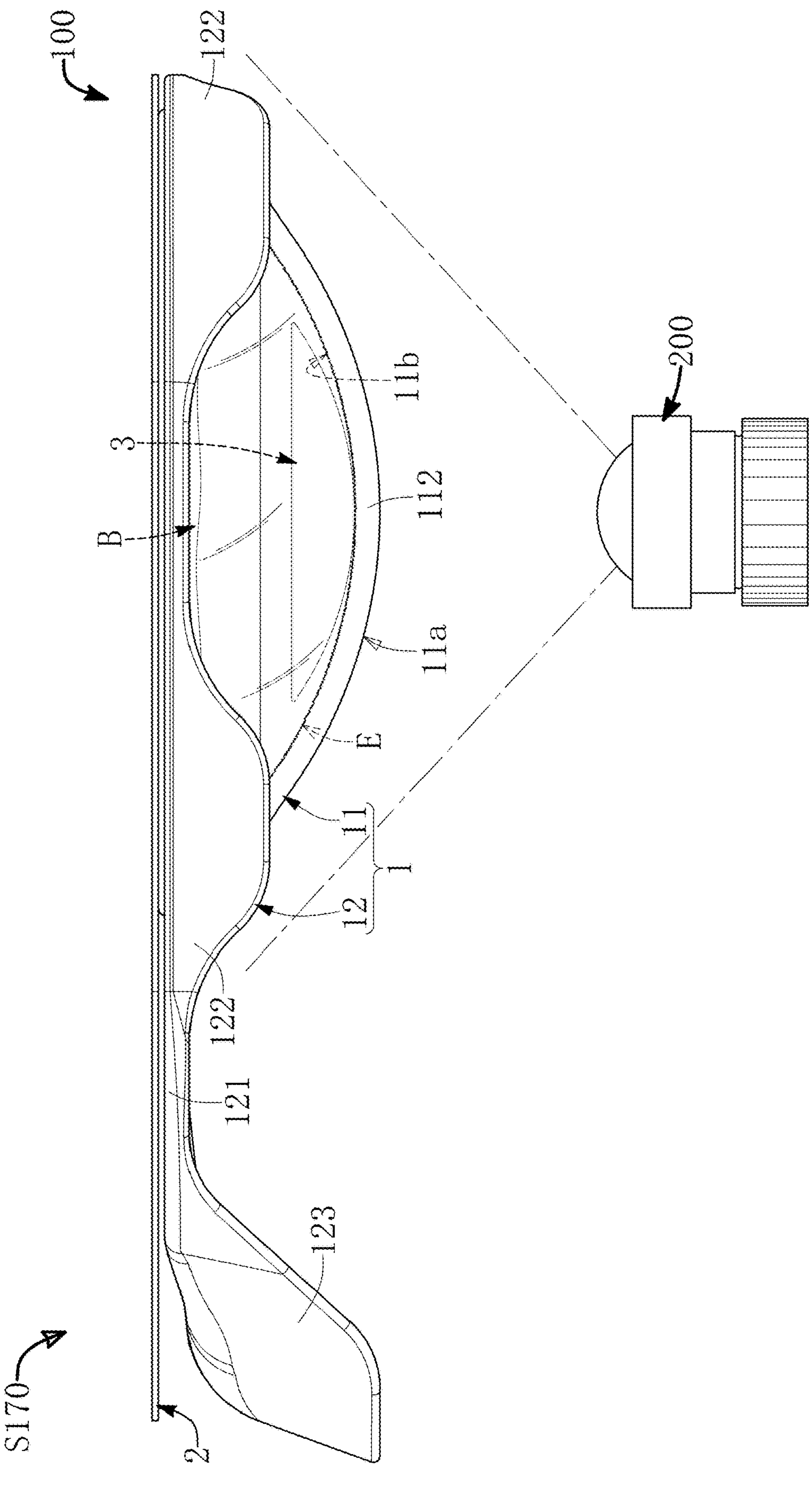
FIG. 11 is a schematic view showing a lens detection step of FIG. 9.

As shown in FIG. 9 and FIG. 11, the lens detection step S170 is implemented by using the optical detection instrument 200 to perform a lens defect detection process for the contact lens 3 located in the accommodating slot body 11. Since the accommodating slot body 11 is presented in the second transparency (e.g., transparent), the accommodating slot body 11 allows light to substantially pass therethrough, such that the optical detection instrument 200 can precisely detect any defect of the contact lens 3.

In summary, the accommodating slot body 11 in the detection method S100 of the present embodiment is cooperated with the preservation liquid 4 for being changeable between the first transparency and the second transparency, so that the slot detection step S130 of the detection method S100 can be implemented to the accommodating slot body 11 presented in the first transparency, and the lens detection step S170 of the detection method S100 can be implemented to the accommodating slot body 11 of the contact lens product 100 presented in the second transparency, thereby facilitating the optical instrument 200 to perform a complete detection.

In addition, in the lens detection step S170, the contact lens 3 is preferable to be entirely immersed in the preservation liquid 4, and the contact lens 3 corresponds in position to the wet region R1 of the accommodating slot body 11, so that the optical detection instrument 200 can precisely detect any defect of the contact lens 3, but the present disclosure is not limited thereto.

Beneficial Effects of the Embodiment

In conclusion, the accommodating slot body in the detection method of the present disclosure is cooperated with the preservation liquid for being changeable between the first transparency and the second transparency, so that the slot detection step of the detection method is implemented to the accommodating slot body presented in the first transparency, and the lens detection step of the detection method is implemented to the accommodating slot body of the contact lens product presented in the second transparency, thereby facilitating the optical instrument to perform a complete detection.

Moreover, in any one of the contact lens product and the packaging case provided by the present disclosure, the optical microstructures having the similar height-to-width ratios (e.g., 0.01 to 0.1) are arranged on the inner surface of the accommodating slot body for being cooperated with the preservation liquid, thereby enabling a transparency of the accommodating slot body to be changeable between the first transparency and the second transparency, so that the accommodating slot body can be selectively presented in the first transparency or the second transparency according to different conditions.

Specifically, in any one of the contact lens product and the packaging case provided by the present disclosure, the changing effect of the accommodating slot body between the first transparency and the second transparency can be further increased through the detailed structural features of the accommodating slot body (e.g., any one of the optical microstructures having a conical shape, and the optical microstructures connected to each other and distributed on the inner surface of the accommodating slot body; the width of any one of the optical microstructures being within a range from 0.01 mm to 0.1 mm).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A packaging case of a contact lens product, wherein the packaging case of the contact lens product comprises:

an accommodating slot body having a plurality of optical microstructures randomly placed on an inner surface thereof, wherein each of the plurality of optical microstructures has a height-to-width ratio being within a range from 0.01 to 0.1, whereby the accommodating slot body has a first transparency; and a sheet body connected to the accommodating slot body;

wherein the accommodating slot body is configured to allow at least part of the plurality of optical microstructures to be in contact with a preservation liquid for enabling a part of the accommodating slot body corresponding in position thereto to have a second transparency that is greater than the first transparency.

2. The packaging case of the contact lens product according to claim 1, wherein a width of any one of the plurality of optical microstructures is within a range from 0.01 mm to 0.1 mm.

3. The packaging case of the contact lens product according to claim 1, wherein any one of the plurality of optical microstructures has a conical shape, and the plurality of optical microstructures are distributed on at least 70% of an area of the inner surface of the accommodating slot body and are connected to each other.

4. The packaging case of the contact lens product according to claim 1, wherein least one of the plurality of optical microstructures is recessed in or protrudes from the inner surface of the accommodating slot body.

5. The packaging case of the contact lens product according to claim 1, wherein a part of at least one of the plurality of optical microstructures is recessed in the inner surface of the accommodating slot body, and another part of the at least one of the plurality of optical microstructures protrudes from the inner surface of the accommodating slot body.

* * * * *